Sept. 15, 1959     A. G. BADE     2,903,899

MULTI-SPEED DRIVE

Filed Nov. 18, 1957     4 Sheets-Sheet 1

INVENTOR.
Alfred G. BADE

BY Quarles & French

Attorneys

Sept. 15, 1959    A. G. BADE    2,903,899
MULTI-SPEED DRIVE
Filed Nov. 18, 1957    4 Sheets-Sheet 2

INVENTOR.
Alfred G. BADE
BY
Quarles & French
Attorneys

Sept. 15, 1959  A. G. BADE  2,903,899
MULTI-SPEED DRIVE

Filed Nov. 18, 1957  4 Sheets-Sheet 3

INVENTOR.
Alfred G. BADE
BY
Quarles & French
Attorneys

Sept. 15, 1959      A. G. BADE      2,903,899
MULTI-SPEED DRIVE
Filed Nov. 18, 1957      4 Sheets-Sheet 4
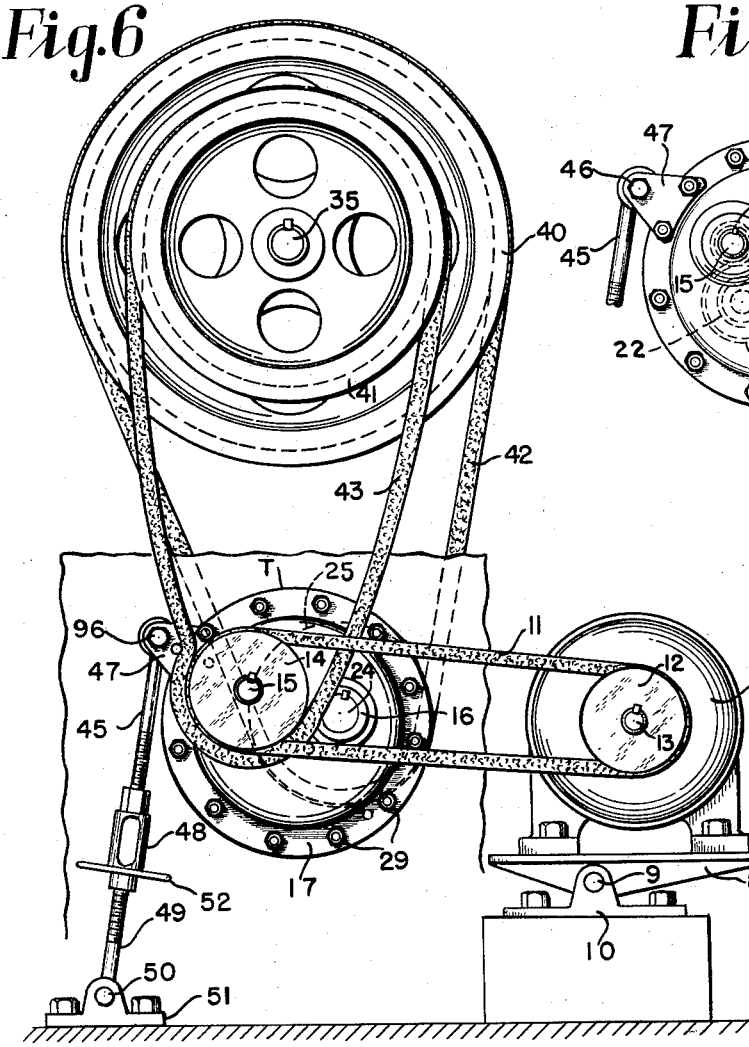
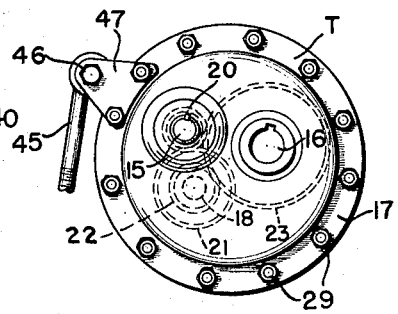
INVENTOR.
Alfred G. BADE
BY
Quarles & French
Attorneys

United States Patent Office 2,903,899
Patented Sept. 15, 1959

2,903,899

MULTI-SPEED DRIVE

Alfred G. Bade, Brookfield, Wis., assignor to The Falk Corporation, Milwaukee, Wis., a corporation of Wisconsin Application November 18, 1957, Serial No. 697,184

4 Claims. (Cl. 74—216.5)

The invention relates to multi-speed drive.

The general object of the invention is to provide a simple and inexpensive drive mechanism for effecting the operation of a driven mechanism at one or another of widely different speeds by power derived from a single speed source. While this general object was attained by the multi-speed drive of my prior U.S. Patent No. 2,797,585, it was found that this form of drive in which the high speed was obtained through the reducer unit subjected it to such a severe duty that it was objectionable for use with the high speeds required for some types of installations and a special object of this invention is to provide a multi-speed drive in which the high speed is accomplished without subjecting the reducer unit itself to a driving torque.

A further object of the invention is to provide a multi-speed drive using any suitable standard type of electric motor and to pivotally mount this motor on its support to compensate for slight changes in belt centers occasioned by the shifting of certain of the transmission elements in the operation of the drive.

A further object of the invention is to provide a multi-speed drive in which the drive motor is connected by a belt with the input shaft of a speed reducer unit which is shiftably mounted on a fixed support to connect one or the other of a pair of belts to the mechanism to be driven in different speed relationships or permit both belts to be disengaged at the will of the operator.

The invention further consists in the several features hereinafter set forth and more particularly defined by claims at the conclustion hereof.

In the drawings:

Fig. 6 is a view similar to Fig. 1 showing the drive mechanism in its low speed position;

Fig. 7 is a front elevation of the transmission unit shown in Fig. 1.

Figure 2:
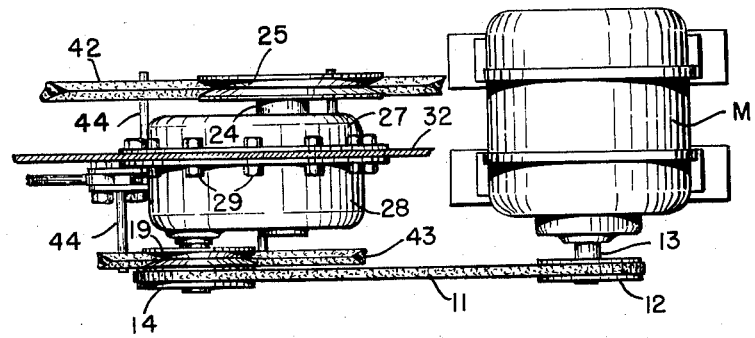
Fig. 2 is a horizontal sectional view taken on the line 2—2 of Fig. 1.

In general, the multi-speed drive mechanism includes a drive motor M, a transmission unit T, a belt drive connection between said motor M and unit T, and selectively operable belt drive connections between said transmission unit and the mechanism to be driven.

The motor M which may be of any suitable standard type has its base mounted on a support or base plate 8 tiltable about a pivot pin 9 carried by fixed base brackets 10, the pivot 9 being offset relative to the center of mass of the motor to constantly urge said motor in a clockwise direction to tension a belt 11 trained between a pulley 12 on the shaft 13 of the motor and a pulley 14 on the input shaft 15 of the transmission unit T.

Figure 3:
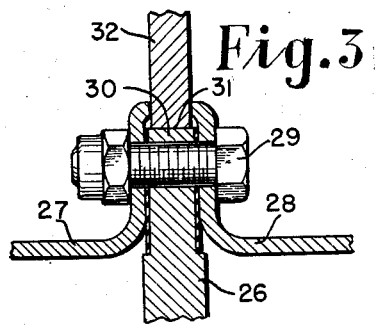
Fig. 3 is a detailed vertical sectional view taken on the line 3—3 of Fig. 1.

The transmission unit T may be any suitable speed reducer unit of the type having its input shaft 15 radially spaced from its output shaft 16, both shafts in the present instance being eccentrically disposed relative to the center of oscillation of its housing 17. This unit may be similar in detail to that of the speed reducer shown and described in my prior U.S. Patent No. 2,762,232, dated Sept. 11, 1956, and in addition to the shafts 15 and 16 includes a transmission shaft 18. The drive shaft 15 projects from the front of the housing and in addition to the pulley 14 carries a pulley 19 and has a reduction gear connection with the shaft 18 through gears 20 and 21 on the respective shafts 15 and 18. The shaft 18 also carries a pinion or small gear 22 meshing with a larger gear 23 on the hollow output shaft 16 to provide a second speed reduction. A shaft member 24 is mounted in the bore of the shaft 16 in keyed relation therewith and extends rearwardly of the housing 17 and carries a pulley 25. As shown in Fig. 3, the transmission unit, similar to the above referred to patent, has a medially disposed panel member 26 to which the casing members 27 and 28 are secured by bolts 29. In the present instance use is made of the panel member 26 as a pivot mounting for the transmission unit, its circular peripheral portion 30 being mounted to turn in a circular opening 31 formed in a fixed plate or support 32 which may form a part of the mechanism to be driven.

By way of example, the multi-drive embodying the invention has been shown applied to an industrial laundry washer W which includes a fixed drum 33 and a perforated wash carrying drum 34 mounted on shaft supports at its opposite ends for rotation in the fixed drum. The shaft support at the drive end of the drum 33 has been shown and includes the shaft 35 journaled in bearings 36 and 37 carried by a panel 38 and the plate or support 32, respectively, mounted in and at the front end of the fixed drum 33. The shaft 35 carries a large pulley 40 and a smaller pulley 41. The pulley 40 is adapted to be connected by a belt 42 with the pulley 25. The pulley 41 is adapted to be connected by a belt 43 with the pulley 19. The belts run fast or loose and in their loose state are restrained by sets of pins 44 extending laterally from the sides of the housing.

The adjusted position of the transmission unit and hence the release or selective driving engagement of the belts 42 and 43 is determined by any suitable means for rotating the housing 17 relative to its fixed support 32 and holding it in its adjusted position. By way of example, I have shown an extensible and contractible link connection between the housing and a fixed support comprising a rod 45 pivotally connected at one end to a pivot bolt 46 anchored in a bracket 47 fixed to the housing 17 and having a threaded connection at its opposite end with a turnbuckle 48 to the opposite end of which the oppositely threaded end of a rod 49 is also connected. The other eyed end of the rod 49 is pivotally mounted on a pin 50 anchored in a bracket 51 mounted on the floor or other fixed support. The turnbuckle 48 carries a handwheel 52 by which it may be turned to lengthen or shorten the link.

It is to be noted that the shaft 35 is substantially alined vertically with the center of rotation of the panel 26 and the housing 17 and that the shafts 15 and 16 are disposed on opposite sides of this center line and eccentrically disposed relative to the center of rotative adjustment of the housing 17. As a result, rotative adjustment of the housing 17 in a clockwise direction or an anti-clockwise direction will shift the shafts 15 and 16 and their pulleys 19 and 25 to different positions relative to the pulleys 41 and 40 and thereby loosen or tension the belts 43 and 42.

Figure 1:
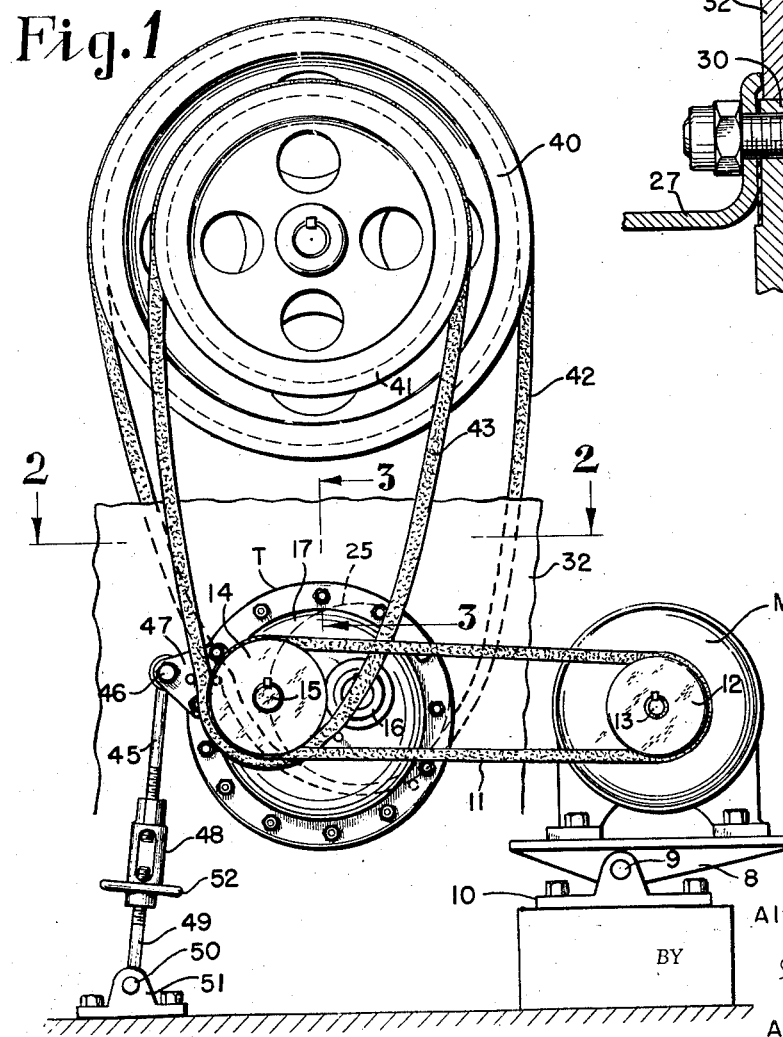
Fig. 1 is a front elevation of a drive mechanism embodying the invention, showing it in its idling position, parts being broken away.
Figure 4:
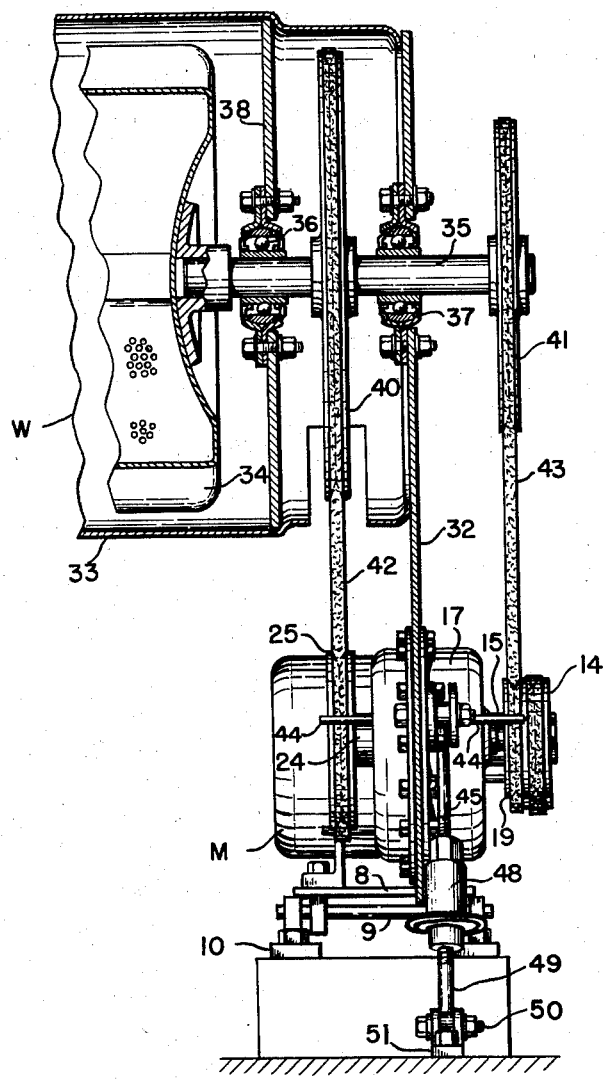
Fig. 4 is a side elevational view of the drive mechanism.

With this construction when the turnbuckle 48 is adjusted so that the shafts 15 and 16 are substantially alined in a horizontal plane, the belts 43 and 42 will be loose as shown in Fig. 1. Under these conditions, the motor M can be started and allowed to come up to speed before it is appreciably loaded so that a standard motor of, for example, 1750 r.p.m., can be used without resorting to any special motor with high starting torque characteristics.

On the extension of the link previously described from its no-load position by the turning of the handwheel 52, the housing 17 is turned in a clockwise direction to bring the pulley 25 into tensioned driving engagement with the belt 42 as shown in Fig. 6 to drive the drum 34 in its washing cycle through the speed reduction transmission unit and the belts 11 and 42. Where the motor M is rated at one and one-half H.P. and there is a reduction of 20–1 in the transmission unit, the pulley ratios for the belts 11 and 42 may be such as to drive the drum 34 at 33 r.p.m. with an expenditure of ½ H.P. at high torque.

Figure 5:
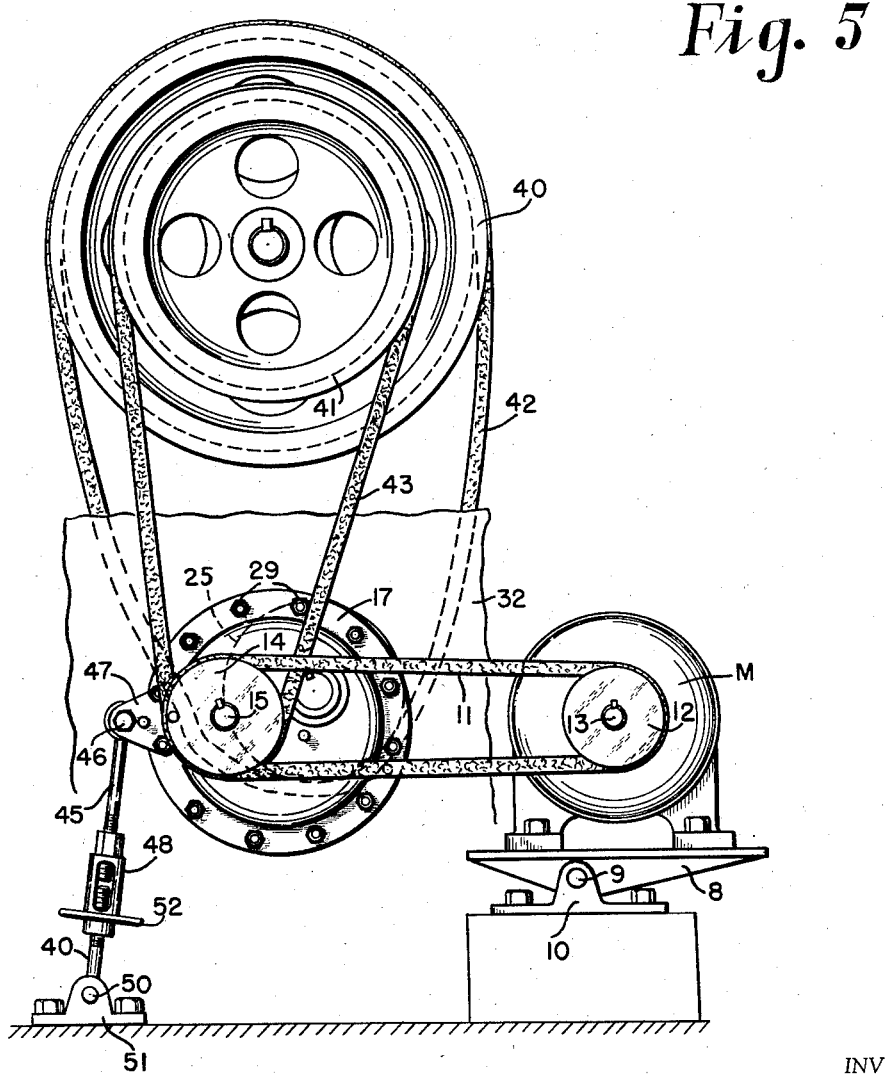
Fig. 5 is a view similar to Fig. 1 showing the drive mechanism in its high speed position.

On the shortening of the link previously described from its no-load position by the turning of the handwheel 52, the housing is turned in a counterclockwise direction to bring the pulley 19 into tensioned engagement with the belt 43, so that the motor through the belt 11 and pulley 14 drives the shaft 15 and pulley 19. Under these conditions the speed of rotation of the shaft 35 may with the pulley ratios selected be 557 r.p.m. at 1½ H.P. load. During this operation, the reducer unit runs idle since the output pulley 25 is then disconnected from the belt 42 as shown in Fig. 5.

It is to be noted that the ratio of the pulleys 25 and 40 provides a third reduction in speed and that the ratio of the pulleys 19 and 41 provides the desired reduction for the high speed drive of the shaft 35 though this latter may be varied to meet the conditions of other mechanisms to be driven.

Any slight fore-shortening of the sheave or pulley centers by the rotative adjustment of the transmission unit when changing speed is compensated for by the automatic shifting of the motor M relative to its fixed support and at the same time the overbalance of the motor in a direction away from the pulley 14 automatically adjusts the belt tension to motor load.

I desire it to be understood that this invention is not to be limited to any particular form or arrangement of parts except in so far as such limitations are included in the appended claims.

What I claim as my invention is:

1. In a multi-speed drive mechanism, the combination with a shaft to be driven and a power shaft, of: a shiftable speed reducing transmission unit, including an input shaft and an output shaft; a belt and pulley drive connection between said power shaft and said input shaft; a belt and pulley drive connection between said output shaft and the shaft to be driven; a belt and pulley drive connection between said input shaft and the shaft to be driven; and means for shifting said transmission unit to selectively drivingly connect either alone of said last two named drive connections, the other of the two being disconnected, or to disconnect both of said last two named drive connections.

2. The multi-speed drive mechanism defined in claim 1, wherein: the input shaft and the output shaft of the transmission unit are journaled in a housing rotatably mounted in a fixed support; and wherein said two shafts are eccentrically mounted relative to the axis of rotation of the housing and on opposite sides of this axis; and all the shafts and the axis of rotation of the housing are substantially parallel; and, when the drive connection between the output shaft and the shaft to be driven, and the drive connection between the input shaft and the shaft to be driven, are both disconnected, then the axis of rotation of the housing, and the input and output shafts of the transmission unit lie substantially in the same plane; and said plane is substantially perpendicular to the plane in which lie the shaft to be driven and the axis of the housing.

3. The multi-speed drive mechanism defined in claim 2, wherein: when the drive connection between the output shaft and the shaft to be driven, and the drive connection between the input shaft and the shaft to be driven, are both disconnected, the axis of rotation of the housing, the input shaft of the transmission unit, and the power shaft lie substantially in the same plane; and there is means for continuously tensioning the belt of the drive connection between the power shaft and the input shaft of the transmission unit.

4. In a multi-speed drive mechanism, the combination with a shaft to be driven and a power shaft, of: a speed reducing transmission unit, including a housing rotatably mounted on a fixed support, and two shafts projecting from said housing; a driving connection between said power shaft and said transmission unit, whereby rotation is imparted to said two projecting shafts; a belt and pulley drive connection between each of said two projecting shafts and the shaft to be driven; and means for rotative adjustment of said housing to selectively drivingly connect either alone of said last two drive connections, the other of the two being disconnected, or to disconnect both of said last two drive connections; wherein the transmission unit includes a panel member having a circular periphery; and wherein the housing comprises two cup-like outwardly flanged members, the flanges of which are removably secured to opposite faces of the panel member and have peripheries extending slightly beyond the periphery of the panel member; and wherein the fixed support has a circular hole serving as a journal for the panel member; and wherein the peripheries of the flanges embrace the support adjacent the edges of the hole therein.

References Cited in the file of this patent

UNITED STATES PATENTS

| | | |
|---|---|---|
| 636,024 | Creese | Oct. 31, 1899 |
| 1,129,906 | Roberts et al. | Mar. 2, 1915 |
| 2,211,986 | Pfleger | Aug. 20, 1940 |
| 2,556,259 | Dorris et al. | June 12, 1951 |
| 2,585,300 | Condon | Feb. 12, 1952 |